(12) United States Patent
Hong et al.

(10) Patent No.: US 7,893,995 B2
(45) Date of Patent: Feb. 22, 2011

(54) DISPLAY APPARATUS AND SIGNAL PROCESSING METHOD THEREOF

(75) Inventors: Joo-Sun Hong, Suwon-si (KR); Balk-Hee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1269 days.

(21) Appl. No.: 11/477,678

(22) Filed: Jun. 30, 2006

(65) Prior Publication Data

US 2007/0008427 A1  Jan. 11, 2007

(30) Foreign Application Priority Data

Jul. 7, 2005  (KR) ............... 10-2005-0061388

(51) Int. Cl.
*H04N 7/00* (2006.01)

(52) U.S. Cl. .............. 348/468; 348/465; 348/478

(58) Field of Classification Search ........... 348/468, 348/465, 473, 476–478, 561, 562, 581, 582; *H04N 7/00, H04N 5/44, 9/74*
See application file for complete search history.

(56) References Cited

U.S. PATENT DOCUMENTS

| 6,239,843 B1 | 5/2001 | Gaudreau | |
|---|---|---|---|
| 6,806,910 B2 * | 10/2004 | Hebbalalu et al. | 348/465 |
| 7,046,298 B2 * | 5/2006 | Kuzumoto et al. | 348/465 |
| 7,697,066 B2 * | 4/2010 | Leary | 348/478 |
| 2007/0002173 A1 * | 1/2007 | Cha et al. | 348/465 |

FOREIGN PATENT DOCUMENTS

| JP | 2000-069425 | 3/2000 |
|---|---|---|
| JP | 2004-064461 | 2/2004 |
| JP | 2004-289537 | 10/2004 |
| KR | 2004-066594 | 7/2004 |

OTHER PUBLICATIONS

Nikola Teslic et al., *Real-Time Hardware/Software Co-Design For VBI Data Representation On PC Over USB*, Serbia and Montenegro, Nis, Telsiks 2003, Oct. 1-3, 2003, 753-755, 2003 IEEE.

* cited by examiner

*Primary Examiner*—Sherrie Hsia
(74) *Attorney, Agent, or Firm*—Roylance, Abrams, Berdo and Goodman, LLP

(57) ABSTRACT

A display apparatus is provided that comprises an analog-to-digital (A/D) converter for converting an analog image signal containing additional information into digital data in accordance with a digital format, a vertical blanking interval (VBI) data processor for extracting VBI data corresponding to the additional information from the digital data input from the A/D converter, and a controller for decoding the extracted VBI data into additional information display data for displaying.

12 Claims, 4 Drawing Sheets

DISPLAY APPARATUS AND SIGNAL PROCESSING METHOD THEREOF

PRIORITY

This application claims the benefit under 35 U.S.C. §119(a) of Korean Patent Application No. 2005-0061388, filed in the Korean Intellectual Property Office on Jul. 7, 2005, the entire disclosure of which is hereby incorporated by reference.

BACKGROUND OF INVENTION

1. Field of Invention

The present invention relates to a display apparatus and a signal processing method thereof. More particularly, the present invention relates to a display apparatus capable of effectively processing a Vertical Blanking Interval (VBI) data signal contained in an input analog image signal, and a signal processing method thereof.

2. Description of the Related Art

In broadcasting standards, such as National Television System(s) Committee (NTSC), Phase Alternation Line (PAL) and Séquentiel couleur avec mémoire (SECAM), a vertical blanking interval (VBI) data signal is overlapped in the VBI of an image signal. The location of the vertical blanking interval where a VBI data signal is contained in an image signal is defined in accordance with each of the broadcasting standards.

The VBI data signal contains various additional information, such as closed caption information, teletext information, copy generation management system (CGMS) information, and sound multiplex index information.

For example, in a one-frame image signal of the NTSC standard having 525 horizontal lines, an odd field comprises a vertical blanking interval (VBI) comprising 21 horizontal lines and an image display interval ranging from the 22nd to 262nd horizontal lines. In each of the horizontal lines within the image display interval is contained an effective image signal. On the other hand, the vertical blanking interval is divided into three equalization pulse intervals (EQIs) comprising 9 horizontal lines and an additional information interval (AII) comprising 11 horizontal lines.

As for a VBI data signal contained in a conventional analog image signal, a traditional method is used in which data is captured by means of slicing a corresponding signal level in accordance with an operation of an analog circuit in a microcomputer or an analog decoder corresponding thereto. The data is then decoded and then displayed on-screen.

However, if the signal level of an input analog image signal is weak or there is generated noise, a VBI data signal contained therein is damaged and causes an error so that the erroneously recovered data is displayed on-screen.

SUMMARY OF THE INVENTION

Accordingly, it is an object of the present invention to provide a display apparatus capable of correctly and effectively executing recovery processing of a VBI data signal contained in an input analog image signal, and a signal processing method thereof.

The foregoing and other objects of the present invention can be achieved by providing a display apparatus comprising an analog-to-digital (A/D) converter for converting an analog image signal containing additional information into digital data in accordance with a digital format, a VBI data processor for extracting VBI data corresponding to the additional information from the digital data input from the A/D converter, and a controller for decoding the extracted VBI data into additional information display data for displaying.

According to an aspect of the present invention, the display apparatus further comprises a storage unit for storing the VBI data.

According to another aspect of the present invention, the controller maps the VBI data extracted from a VBI containing the additional information to binary values, generates a data synchronous clock according to clock run-in data of the VBI, and generates the VBI data corresponding to the mapped binary values based on the data synchronous clock.

According to another aspect of the present invention, the controller comprises a VBI data decoder for decoding the transmitted VBI data extracted based on the data synchronous clock into the additional information display data.

According to another aspect of the present invention, the display apparatus further comprises a scaler for multiplexing the additional information display data and image information data within the digital data and converting them to be suitable for an external display.

According to another aspect of the present invention, the VBI data processor can be configured to transmit corresponding image information data to the scaler if the image information data except the VBI data exists in the digital data.

The foregoing and other aspects of the present invention can be achieved by providing a signal processing method of a display apparatus processing an input image signal and comprising an A/D converter, a VBI data processor and a controller. The method comprises converting an analog image signal containing additional information into digital data in accordance with a digital format in the A/D converter, extracting VBI data corresponding to the additional information from the input digital data in the VBI data processor, and decoding the input VBI data into additional information display data for displaying in the controller.

According to an aspect of the present invention, the method further comprises storing the VBI data in a storage unit.

According to another aspect of the present invention, extracting VBI data comprises mapping the VBI data extracted from the digital data in a VBI containing the additional information to binary values in the controller, generating a data synchronous clock according to clock run-in data of the VBI, and generating the VBI data corresponding to the mapped binary values based on the data synchronous clock.

According to another aspect of the present invention, decoding of the additional information display data comprises decoding the VBI data extracted and transmitted from a VBI data decoder provided in the controller into the additional information display data based the data synchronous clock.

According to another aspect of the present invention, the method further comprises multiplexing the additional information display data and image information data within the digital data and converting them to be suitable for an external display in a scaler.

According to another aspect of the present invention, the method further comprises transmitting corresponding image information data from the VBI data processor to the scaler if there does not exist VBI data but image information data in the digital data.

It is to be understood that both the foregoing general description and the following detailed description are exemplary and explanatory and are intended to provide further explanation of the invention as claimed.

BRIEF DESCRIPTION OF THE DRAWINGS

The above and other aspects and advantages of the prevent invention will be more apparent from the following detailed description of certain exemplary embodiments with reference to the accompany drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
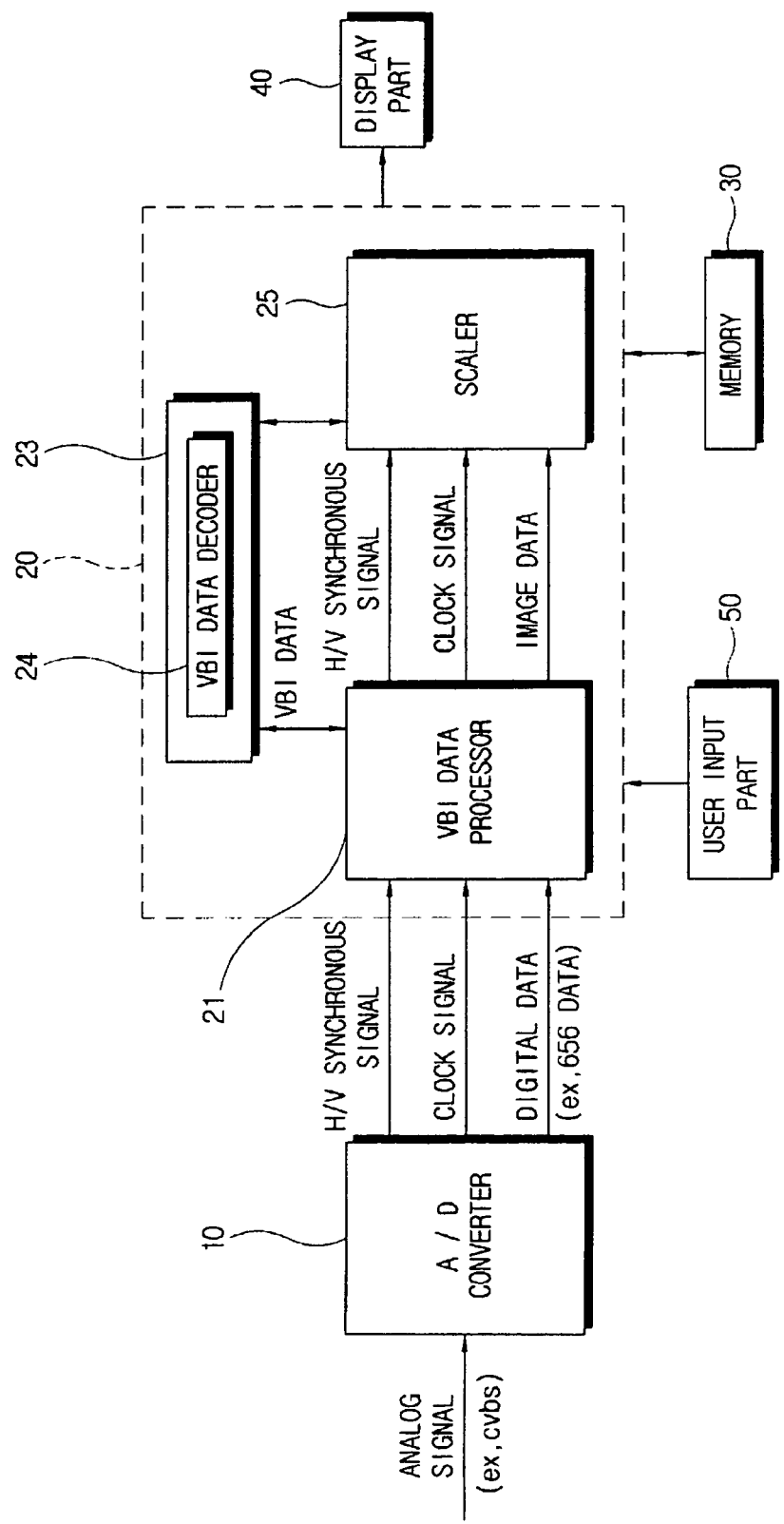
FIG. 1 is a schematic block diagram of a display apparatus according to an exemplary embodiment of the present invention.

FIG. 1 is a schematic block diagram of a display apparatus for processing an input image signal according to an exemplary embodiment of the present invention. As shown therein, the display apparatus, according to an exemplary embodiment of the present invention, comprises an A/D converter 10 for converting an input analog image signal containing additional information into digital data in accordance with a digital format. The display apparatus further comprises a VBI data processor 21 for extracting VBI data corresponding to the additional information from the digital data input from the A/D converter 10, and a controller 23 for decoding the extracted VBI data into displayable VBI data for display.

The display apparatus can further comprising a scaler 25 for compounding the VBI data decoded in the controller 23 and image information data extracted from the VBI data processor 21, and then displaying them on a display 40. The VBI data processor 21, controller 23, and the scaler 25 can be configured as a signal processor 20. Signal processor 20 can convert and process digital data input from the A/D converter 10 to an appropriate format to be displayed on the display 40. The controller 23 can also be configured to control each portion of a display apparatus.

In the A/D converter 10, the whole input analog image signal is converted into digital data. The A/D converter 10 converts corresponding digital data into a data stream 72 (refer to FIG. 3) and then outputs the data using a digital format such as, for example, Consultative Committee on International Radio (CCIR) 656 format. In an exemplary embodiment, the A/D converter 10 can be embodied as an analog decoder.

Further, as for analog image signals in the present exemplary embodiment, broadcasting signals in accordance with a broadcasting standard can be input using a composite video baseband signal (CVBS) format. Furthermore, analog image signals transmitted from various kinds of external devices, such as Community Area Televisions (CATVs) or cable television signals, Video Tape Recorders (VTRs), camcorders or computers, may be input to the A/D converter 10.

Additional information contained in an analog image signal can be overlapped in a vertical blanking interval (VBI) and then transmitted as a VBI data signal in accordance with broadcasting standards such as, for example, NTSC, PAL and SECAM. Additional information transmitted as a VBI data signal comprises closed caption information, teletext information, copy generation management system (CGMS) information, sound multiplex index information and the like. A VBI data signal can contain various additional information, such as simple recording reservation information, color test pattern information, or index information needed for detection through closed-circuit television (CCTV), as necessary. Data patterns of additional information and lines in which there exist data may be determined in accordance with each of the broadcasting standards.

Figure 2:
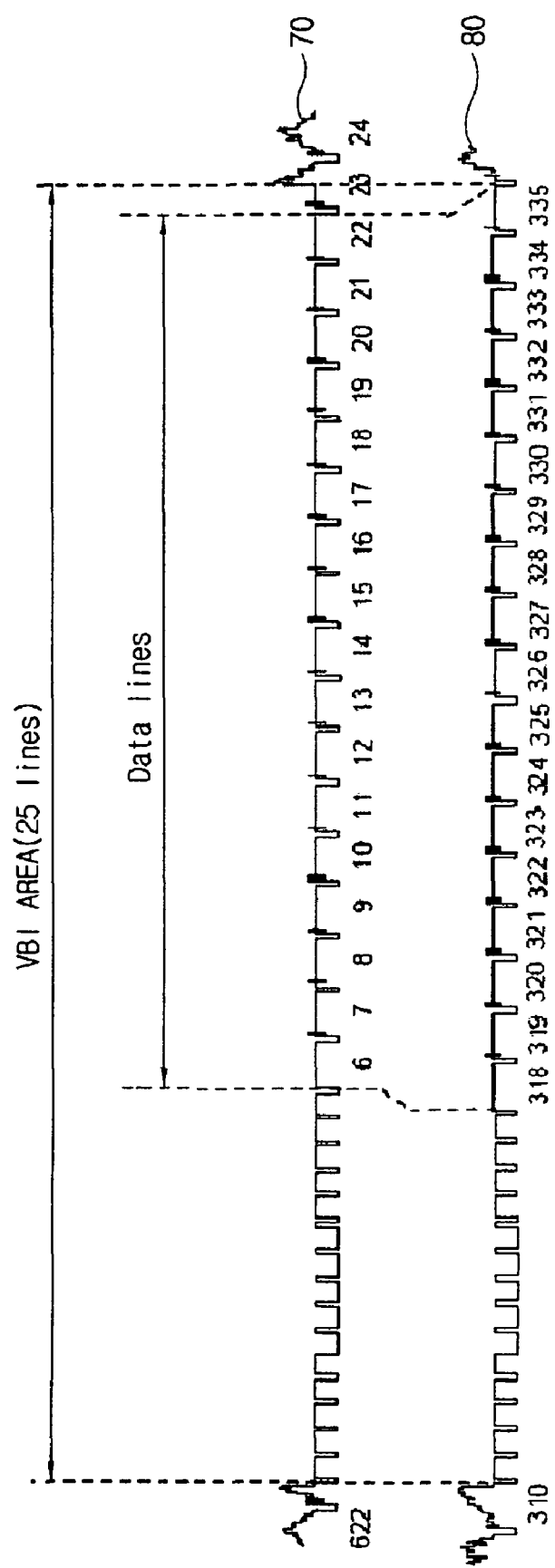
FIG. 2 is a view illustrating a signal in a VBI of a display apparatus according to an exemplary embodiment of the present invention.

FIG. 2 shows an example of an analog image signal in accordance with a PAL broadcasting standard having 625 lines. Referring to FIG. 2, an odd field image signal 70 and an even field image signal 80 each comprise a VBI having 25 lines. Further, effective data lines needed for transmitting additional information are included in each of the VBIs of the signals 70 and 80. In the case of the odd field image signal 70, for example, there exist effective data lines in the range from 6th to 22nd, and caption information exists in the 21st line.

If a user needs to display additional information through a display apparatus according to an exemplary embodiment of the present invention, desired caption information can be displayed using a menu required for selection or a separate selection key through a user input 50 or the like. Accordingly, caption information contained in a corresponding effective data line within the VBI of an image signal can be displayed on a display apparatus through a process of signal processing according to an exemplary embodiment of the present invention. The VBI of the PAL broadcasting standard, as shown in FIG. 2, is located differently from that of the foregoing NTSC broadcasting standard.

Assuming that an analog image signal of the foregoing CVBS format is transmitted in accordance with the scale defined by the Institute of Radio Engineers (IRE) as a level ranging from zero to 100 IRE, the zero IRE refers to a pedestal level and 100 IRE refers to maximum brightness. A VBI data signal contained in an effective data line is transmitted as an average level of 50 IRE. In consideration of noise in transmission, the VBI data signal is transmitted as a level ranging from 40 to 80 IRE.

If an analog image signal is converted into digital data in the A/D converter 10 in accordance with the CCIR 656 format, for example, an 8-bit format, the analog image signal corresponding to each level ranging from zero to 100 IRE is converted into a corresponding digital value among 256 digital values ranging from zero to 255, and then transmitted to the VBI data processor 21 as a data stream in accordance with the CCIR 656 format. At this time, the converted data is transmitted as the data stream 72 (refer to FIG. 3) format in accordance with the CCIR 656 format. Such a data stream 72 is transmitted as being converted with respect to not only a data signal in the VBI of each of the fields 70 and 80, but also an image information signal in the same manner.

Figure 3:
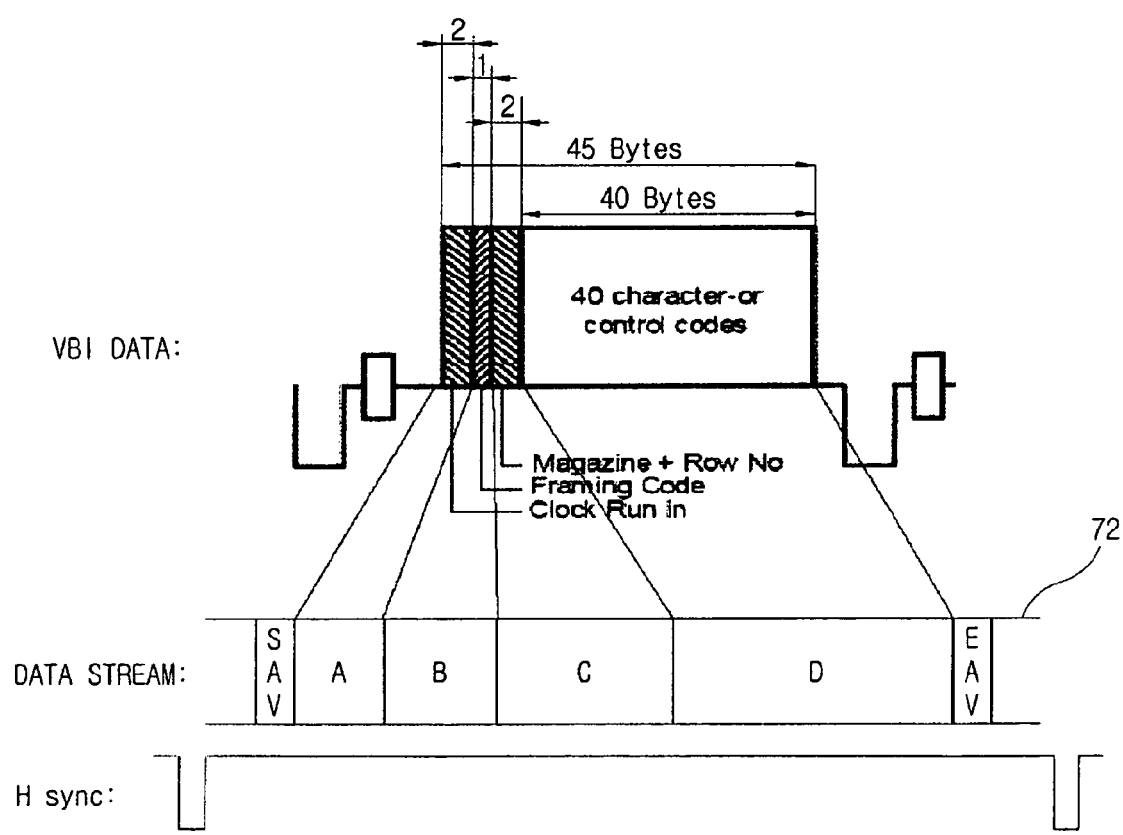
FIG. 3 is a diagram illustrating a configuration for VBI data of a display apparatus according to an exemplary embodiment of the present invention.

Referring to FIG. 3, in the digital data stream 72, Start of Active Video (SAV) refers to a start of effective information data possible for displaying on the display 40, and End of Active Video (EAV) refers to an end of effective information data. Effective image information data corresponding to digitized image information and effective VBI data corresponding to additional information are contained in an interval between the SAV and the EAV. The digital data stream 72 of FIG. 3 shows an example of a digital data stream into which a VBI data signal contained in 21st line among effective data lines in the VBI of a corresponding field is converted in accordance with the CCIR 656 format.

In the meantime, the VBI data processor 21 separates image information data corresponding to image information and VBI data corresponding to additional information from digital data transmitted from the A/D converter 10 in accordance with a digital format, and stores the separated VBI data in memory 30, a storage unit.

If there only exists image information data (that is, there is no VBI data), after determining whether or not there exist VBI data in the transmitted digital data of a data stream format, the VBI data processor 21 transmits the corresponding image information data to the scaler 25 and displays the data on the display 40 through an imaging process.

If there does exist VBI data in the transmitted digital data, the VBI data separated from the VBI data processor 21 are recovered as original data through a decoding process in the controller 23. The controller 23 comprises the VBI data decoder 24 for decoding the transmitted VBI data extracted from the VBI data processor 21 based on the following data synchronous clock into additional information display data.

A process of decoding VBI data will be described with reference to FIG. 3 showing transmission data. VBI data signal showing transmission data is located between horizontal synchronous signals (H sync) in a horizontal line having a fixed position in the VBI within a corresponding field. That is, the VBI data signal comprises a page header having data signals corresponding to a clock run-in data, a framing code and a magazine row number, and an effective data signal having character information following the page header or a control code signal. If the VBI data signal is converted into digital data of the data stream 72 format, it is extracted as a data stream in accordance with a fixed format, arranging the clock run-in data (A), the framing code (B), the magazine row number (C), and the effective data signal or the control code signal (D) between the SAV and the EAV, and transmitted to the VBI data decoder 24 within controller 23.

As described above, if an input analog image signal is of CVBS format, in a data stream in accordance with the CCIR 656 format, luminance signals (Y) and chrominance signals (Cb, Cr) are synchronized in a 27 MHz clock signal in a certain order, for instance, Cb-Y-Cr-Y-Cb-Y- . . . , and then transmitted. Accordingly, VBI data of an 8-bit format converted as a data stream of the CCIR 656 format extracted from the VBI data processor 21 have digital values ranging from zero to 255.

In the VBI data decoder 24 within the controller 23, a process of mapping each digital value of the transmitted data stream to a binary value is performed. In other words, a digital value ranging from zero to 76 corresponding to the range from zero to 30 IRE as a voltage value is mapped to "0", and a digital value of no less than 77 is mapped to "1". The values mapped repeating the corresponding process with respect to each of the digital values are stored in the memory 30.

The clock run-in data (A) repeats "0" or "1" every period, and a clock signal for synchronization needed for extracting VBI data is generated. If VBI data mapped to binary values of "0" or "1" being synchronized in the generated clock signal for synchronization are decoded, effective data corresponding to the clock run-in data of 2 bytes, the framing code of 1 byte, the magazine row number of 2 bytes and character information of the rest of 40 bytes are recovered. For example, the generated clock signal for synchronization is represented as the foregoing original clock signal for synchronization of 27 MHz. Accordingly, in order to recover data more precisely, previous and next data can be compared with each other based on the clock signal for synchronization. That is, a change corresponding to one or two cycles of a clock signal for synchronization is determined as noise so that the previous data may be sustained.

If a clock for synchronization is generated from the clock run-in data, the VBI data extracted from the VBI data processor 21 are precisely recovered as desired data through a decoding process in the VBI data decoder 24, and the VBI data may be displayed to be suitable for an output standard of the display 40 through the scaler 25.

The scaler 25 processes an image signal from the signal processor 20 as a format possible for displaying on the display 40 and then outputs it for display. Accordingly, the scaler 25 can be configured to display a corresponding image on the display 40 based on image data, a horizontal/vertical (H/V) synchronous signal and a clock signal provided from the VBI data processor 21 by the control of controller 23.

Further, the scaler 25 enables the VBI data transmitted being decoded from the VBI data decoder 24 provided in the controller 23 to be displayed on the display 40. Furthermore, as described above, the scaler 25 compounds image data separated by the VBI data processor 21 and VBI data decoded in VBI data decoder 24 within the controller 23 to be displayed on the display 40. Scaler 25 can be configured for various image processing.

A signal processing method for processing VBI data in a display apparatus according to an exemplary embodiment of the present invention will be described below with reference to the flowchart of FIG. 4.

Figure 4:
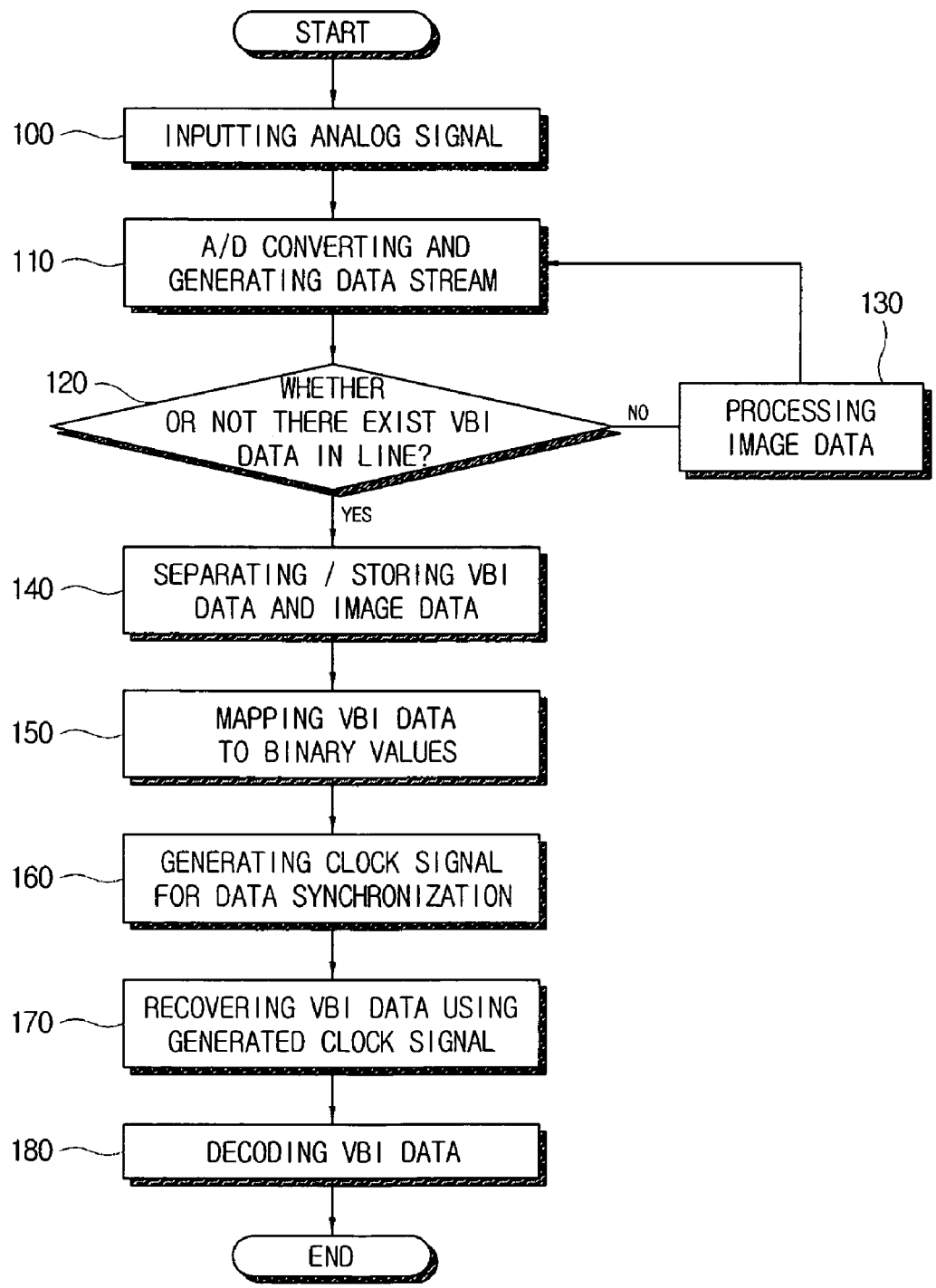
FIG. 4 is a flowchart for signal processing of a display apparatus according to an exemplary embodiment of the present invention.

Referring to FIG. 4, if an analog image signal is input at operation 100, an A/D converter 10 converts the signal into digital data in accordance with a digital format (for example, the foregoing CCIR 656 format) to generate a data stream at operation 110. A horizontal/vertical synchronous signal and a clock signal, which are contained in the original image signal, are converted together into digital data. The digital data converted in this manner are transmitted to a VBI data processor 21, and the VBI data processor 21 determines whether there exist VBI data corresponding to additional information in the corresponding digital data at operation 120. The presence of the VBI data, as described above, may be determined based on a digital value converted in accordance with each level voltage value (IRE level), and it may also be determined with respect to each line within the VBI of the image signal.

If there only exists image information data (that is, there is no VBI data) corresponding to image information in the converted digital data, the image information data may be processed in a format suitable for displaying on display 40 through a scaler 25 at operation 130.

Further, if there exist VBI data in the converted digital data, VBI data corresponding to the additional information and image information data are separated and extracted from the VBI data processor 21 at operation 140. At this time, the extracted VBI data may be stored in a memory 30 as a storage unit. The extracted VBI data and image information data are transmitted to a data decoder 24 within the controller 23 and the scaler 25, respectively.

The VBI data transmitted to the VBI data decoder 24 passes through a process of mapping the data to binary values described above at operation 150 and a process of generating a clock signal for data synchronization needed for recovering the original data at operation 160. Accordingly, the VBI data are recovered using the generated clock signal for data synchronization as described above at operation 170, and a process for decoding the VBI data is then finished at operation 180.

In the meantime, the foregoing display 40 can comprise a display panel on which an image is displayed and a panel driver for driving the display panel to display an image signal provided from the signal processor 20. A configuration of corresponding display panel and panel driver may be different in accordance with the type of corresponding display apparatus.

Further, in a display apparatus according to an exemplary embodiment of the present invention, there can be separately provided a signal input (not shown) to which an analog image signal is input. A signal containing at least one of additional information and image information can be input through the signal input. The signal input can be configured in various forms of input receiving signals containing additional information, such as, for example, a CVBS input or S-video input for receiving analog signals like CVBS format or S-video signals, a component input for receiving component signals or a personal computer (PC) input as well as a broadcasting signal receiver for receiving broadcasting signals in accordance with a broadcasting standard. In the aforementioned display apparatus according to an exemplary embodiment of the present invention, it is illustrated that a signal received through a signal input is a composite video baseband signal (CVBS), and the signal input is a CVBS input. Further, a signal amplifier (not shown) may be included for converting a CVBS signal received through the signal input into a certain signal level and then outputting it.

Accordingly, if a user selects a desired channel or signal source, a user input 50 enables a corresponding broadcasting signal or image signal to be input through a signal input. Further, selecting a view mode for viewing various kinds of additional information contained in VBI data separately or together with image information, or adjusting volume, image quality or the like may be provided through the user input 50.

As set forth above, the present invention can provide a display apparatus capable of correctly and effectively executing recovery processing a VBI data signal contained in an input analog image signal, and a signal processing method thereof.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims.

What is claimed is:

1. A display apparatus comprising:
   an analog-to-digital (A/D) converter for converting an analog image signal containing additional information into digital data in accordance with a digital format;
   a vertical blanking interval (VBI) data processor for extracting VBI data corresponding to the additional information from the digital data; and
   a controller for decoding the extracted VBI data into additional information display data for displaying on the display apparatus.

2. The display apparatus according to claim 1, further comprising a storage unit for storing the VBI data.

3. The display apparatus according to claim 1, wherein the controller is configured to map the VBI data to binary values, generate a data synchronous clock according to clock run-in data of the VBI, and generate the VBI data corresponding to the mapped binary values based on the data synchronous clock.

4. The display apparatus according to claim 3, wherein the controller comprises a VBI data decoder for decoding the VBI data into the additional information display data based on the data synchronous clock.

5. The display apparatus according to claim 1, further comprising a scaler for multiplexing the additional information display data and image information data within the digital data and converting the multiplexed data to be suitable for an external display.

6. The display apparatus according to claim 5, wherein the VBI data processor transmits corresponding image information data to the scaler if the image information data, except the VBI data, exists in the digital data.

7. A signal processing method for a display apparatus, the method comprising:
   converting an analog image signal containing additional information into digital data via an analog-to-digital (A/D) converter in accordance with a digital format;
   extracting vertical blanking interval (VBI) data corresponding to the additional information from the input digital data via a VBI data processor; and
   decoding the VBI data into additional information display data for displaying in a display apparatus controller.

8. The method according to claim 7, further comprising storing the VBI data in a storage unit.

9. The method according to claim 7, wherein extracting VBI data further comprises:
   mapping the VBI data extracted from the digital data in a VBI containing the additional information to binary values in the controller;
   generating a data synchronous clock signal according to clock run-in data of the VBI; and
   generating the VBI data corresponding to the mapped binary values based on the data synchronous clock signal.

10. The method according to claim 9, wherein decoding the VBI data further comprises decoding the VBI data via a VBI data decoder provided in the controller into the additional information display data based on the data synchronous clock signal.

11. The method according to claim 7, further comprising multiplexing in a scaler the additional information display data and image information data within the digital data and converting the multiplexed data to be suitable for an external display.

12. The method according to claim 11, further comprising transmitting corresponding image information data from the VBI data processor to the scaler if there exist image information data within the digital data but not VBI data.

* * * * *